Patented May 7, 1946

2,399,927

UNITED STATES PATENT OFFICE 2,399,927

PRODUCTION OF ISOPARAFFINS

Donald Albert Howes and Eric William Musther Fawcett, Sunbury-on-Thames, England, assignors to Anglo-Iranian Oil Company Limited, London, England, a British joint-stock corporation No Drawing. Application October 30, 1941, Serial No. 417,101. In Great Britain April 2, 1940

6 Claims. (Cl. 260—683.5)

This invention relates to the production of isoparaffins such as isobutane by the catalytic conversion of normal hydrocarbons such as butane or those of higher molecular weight than butane, or of materials containing substantial proportions of such normal paraffins.

It has already been proposed to isomerise paraffinic hydrocarbons having from four to twelve carbon atoms in the molecule by passing the paraffins, at temperatures between 200° C. and 600° C. and at pressures above 100 atmospheres, together with hydrogen having a partial pressure of less than 5% of the total pressure, over catalysts consisting of an oxide or sulphide of a metal of the 6th to the 8th groups of the periodic system.

It is also well known that this type of isomerisation may be carried out by contacting the normal hydrocarbons with catalysts consisting of an aluminium halide, usually aluminium chloride, but this type of catalyst has a number of disadvantages, for example, they are difficult materials to handle on the large scale due to the ease of hydrolysis and their high degree of volatility makes operation at relatively low temperature essential.

According to the present invention there is provided a process for the isomerisation of a normal paraffin hydrocarbon having at least 4 carbon atoms in the molecule, wherein the said normal paraffin or mixture of hydrocarbons containing said normal paraffins is contacted, in the absence of added hydrogen, with a catalyst comprising an oxide and/or sulphide of a metal of Group VI of the periodic table.

The basic catalyst constituent is in all cases an oxide or sulphide of a metal of Group VI of the periodic table with which may be admixed, oxides or sulphides of metals of Group VI or Group VIII of the periodic table. Oxides or sulphides of metals of Group VIII have relatively slight activity in the absence of metals of Group VI. Examples of catalysts of the above type are tungsten disulphide, a mixture of nickel sulphide and tungsten sulphide and a mixture of molybdenum disulphide and tungsten trioxide. The catalyst constituents may be prepared in any convenient manner, for example, sulphides of Group VIII by the well known wet precipitation methods and sulphides of Group VI by contacting the corresponding oxides with sulphur vapour or a sulphur containing compound, such as hydrogen sulphide, at elevated temperatures of the order of 350° C. The catalyst or catalysts may be used in admixture with or incorporated in relatively inert porous materials such as kieselguhr, silica gel or active carbon, or the catalyst in the condition of powder may be formed by compression into pellets of a shape such that the pellets pack within the reaction vessels more or less irregularly with spaces between them. Catalysts supported on porous carriers may be conveniently prepared by absorbing an aqueous solution of a compound of the desired metal or metals on to the porous support followed by physical or chemical treatment to produce the desired catalyst composition; thus a tungsten sulphide catalyst on silica gel may be prepared by soaking silica gel with a dilute solution of ammonium tungstate, heating the impregnated gel to form tungsten trioxide and treating this product with hydrogen sulphide at elevated temperature to produce tungsten sulphide.

The reaction should be carried out at elevated temperatures in the range 200° C. to 600° C. and preferably at superatmospheric pressures within the range 1 to 1,000 atmospheres.

The reaction may with advantage be carried out in the presence of an inert gas such as methane, nitrogen or carbonic acid gas.

The optimum operating conditions depend to a great extent on the feedstock, the catalyst used and the desired product. When processing n-butane for the production of isobutane using sulphides as catalysts, the optimum operating temperature lies close to 300° C. and moderately high pressure of 20–50 atmospheres can be employed with advantage. Higher reaction temperatures in the range 300–400° C. and higher pressure than 50 atmospheres can however be employed to increase the reaction rate, but as the temperature is raised above 400° C. a degradation reaction sets in resulting in the production of hydrocarbons of lower molecular weight, which is undesirable in a butane isomerisation process.

When the feedstock is n-pentane or a mixture of hydrocarbons containing substantial proportions of n-pentane, and particularly when operating with oxide catalysts, it is advantageous to use higher temperatures than those specified above for n-butane; thus for the production of isopentane from n-pentane we obtain good results using an oxide catalyst at temperatures of about 460° C.

When treating normal hydrocarbons for the production of isoparaffins of lower molecular weight we find it advantageous to increase both the temperature and pressure of the operation. For this type of operation temperatures within the range of 400–550° C. and pressure as high as 250 atmospheres are suitable.

When treating such other normal paraffin hydrocarbons than butane and when high yields of isoparaffin are required, the isoparaffin products other than n-butane may be separated for further treatment; or again, the material under treatment may be passed for treatment through two or other number of reaction vessels or reaction stages in which substantially the same or varying reaction temperatures are maintained.

The process may be carried out as a batch or a continuous operation. Continuous operation is however practically advantageous, and in this mode of working a continuous stream of normal butane or other normal paraffin hydrocarbon or materials containing substantial proportions of such normal paraffin hydrocarbons may be passed alone or in admixture for example with an inert gas through a reaction vessel packed with a catalyst or catalysts, hereinbefore referred to, and maintained at a temperature in the range for example of 200–600° C., and under a pressure within a range for example of about 1–1000 atmospheres and preferably at a pressure within the range of 10 to 250 atmospheres. The product stream leaving the reaction vessel and containing a substantial proportion of isobutane (for example about 10–50%) may be fractionated usually by distillation to separate or partially to separate isobutane from the residual normal paraffin hydrocarbons and from isopentane or other isoparaffin when normal pentane or a normal paraffin hydrocarbon other than substantially pure normal butane is treated. The fraction containing the normal paraffin hydrocarbons may be recirculated through the reaction vessel for further conversion to isobutane or isoparaffins.

In some cases, especially when using sulphides as catalysts, it is of advantage to introduce into the reaction vessel with the hydrocarbon feedstock a small concentration of a sulphur compound such as hydrogen sulphide or methyl mercaptan as with this addition the activity of the catalyst is maintained for a long period.

In operating with the present catalysts particularly at relatively high temperatures, we find that after a long period of operation the catalyst activity may be substantially reduced due to an accumulation of carbon or carbonaceous material. The catalyst may be regenerated by treatment with air or other oxygen containing gas at elevated temperature, the carbon being thus oxidised and removed as gaseous oxides of carbon. If the catalyst thus regenerated is a sulphide, it will generally be converted to the metallic oxide by such treatment, but the original catalyst can normally be reformed by treatment of the regenerated compound with sulphur vapour or a sulphur compound such as hydrogen sulphide.

*Example I.*—A reaction vessel containing a catalyst consisting of a mixture of nickel and tungsten sulphides in pelleted form was heated to 350° C. and normal butane was pumped in until the pressure reached 100 atmospheres, when the reaction vessel was closed. After a reaction period of 5 hours, the product was withdrawn and found to contain 17% of isobutane.

*Example II.*—In a similar experiment to Example I at 370° C. and a reaction period of six hours, the product contained 10.4% of isobutane.

*Example III.*—A continuous stream of n-butane was passed over a catalyst consisting of tungsten disulphide supported on silica gel at a rate equivalent to .6 volume of butane per volume of catalyst per hour. The temperature was 300° C. and a pressure of 22 atmospheres was maintained in the system. The product stream was found to contain 13.7% of isobutane and less than 1% of unsaturated hydrocarbons.

*Example IV.*—The catalyst used in this run consisted of molybdenum sulphide on kieselguhr and was prepared as follows:

40 grams of ammonium molybdate were dissolved in aqueous ammonia (150 ccs.) (S. G.=0.90) and the solution saturated with hydrogen sulphide at room temperature. 100 grams of kieselguhr were added, and the mixture made acid with hydrochloric acid. When precipitation was complete, the chocolate brown product was filtered off and washed with water. The product was then partially dried in a vacuum dessicator, drying being completed in the reactor in a current of inert gas prior to use.

N-butane at a flow rate of 0.35 volume of gaseous butane (measured under the reaction conditions), a temperature of 275° C. and pressure of 300 lb./sq. in. was passed over this catalyst. The product contained 10.0% of isobutane and negligible amounts of lower and unsaturated hydrocarbons.

*Example V.*—This example illustrates the use of a tungsten trioxide catalyst on kieselguhr. This was prepared in the following manner:

Tungstic acid (20 grams) was dissolved in 150 ccs. of aqueous ammonia (S. G.=0.90) and 100 grams of kieselguhr added. The mixture was made acid with hydrochloric acid with stirring until precipitation was complete. The product was filtered off and washed with water until the tungstic acid began to peptise. The product was then dried.

N-butane at a flow rate of 0.34 volume of gaseous butane (measured under the reaction conditions), a temperature of 275° C. and a pressure of 300 lb./sq. in. was passed over this catalyst. The product contained 9.5% of isobutane and negligible amounts of lower and unsaturated hydrocarbons.

*Example VI.*—A high pressure reaction vessel packed with a catalyst consisting of alumina gel impregnated with 3% by weight of molybdenum trioxide and maintained at 385° C. was filled with n-butane to a pressure of 250 lbs./sq. in. After a reaction period of 4 hours, the pressure was released, and the gas thus recovered contained 12.0% isobutane.

*Example VII.*—A stream of n-butane was passed continuously through a reaction vessel packed with a catalyst of Example VI. The operating temperature was 410° C., the pressure 300 lbs./sq. in., and the butane flow rate was 10 volumes of butane (measured under the reaction conditions) per volume of catalyst per hour. The product stream leaving the reaction vessel contained 11% isobutane.

*Example VIII.*—A reaction vessel containing the catalyst of Example *I* was maintained at 463° C., and n-pentane was introduced until the pressure reached 250 lbs./sq. in. After a reaction period of 5½ hours, the product was found to contain 18.0% of isopentane.

We claim:

1. A process for the catalytic conversion of normal paraffin hydrocarbons having at least four carbon atoms in the molecule to produce isoparaffins as a desired product, comprising contacting a feedstock comprising at least one of the said hydrocarbons with a catalyst consisting essentially of at least one compound selected from the group consisting of the oxides and sulphides of metals of group VI of the periodic table, in the absence of added hydrogen and at a temperature within the range 200 to 600° C. and at a pressure within the range 10 to 250 atmospheres.

2. A process for the catalytic conversion of normal paraffin hydrocarbons having at least 10 carbon atoms in the molecule to produce isoparaffins as a desired product, comprising contacting a feedstock comprising at least one of the said normal paraffin hydrocarbons with a catalyst consisting essentially of at least one compound selected from the group consisting of the oxides and sulphides of metals of group VI of the periodic table and at least one compound selected from the group consisting of the oxides and sulphides of metals of group VIII of the periodic table in the absence of added hydrogen and at a temperature within the range 200 to 600° C. and at a pressure within the range 10 to 250 atmospheres.

3. A process for the catalytic isomerisation of normal pentane comprising contacting a pentane feedstock with a catalyst consisting essentially of at least one oxide selected from the group consisting of the oxides of metals of group VI of the periodic table in the absence of added hydrogen and at a temperature of the order of 460° C. and at a pressure up to at least 50 atmospheres.

4. A process for the catalytic conversion of normal hydrocarbons having at least five carbon atoms in the molecule, for the production of isoparaffins of lower molecular weight, comprising contacting a normal hydrocarbon feedstock comprising at least one of the said hydrocarbons with a catalyst consisting essentially of at least one compound selected from the group consisting of the oxides and sulphides of metals of group VI of the periodic table, in the absence of added hydrogen and at a temperature within the range 400 to 550° C. and at a pressure up to 250 atmospheres.

5. A process for the catalytic isomerization of normal butane, comprising contacting a normal butane feedstock with a catalyst consisting essentially of tungsten disulphide and silica gel at a temperature of the order of 300° C. and at a pressure of the order of 22 atmospheres and at a rate of the order of .6 volume of butane per volume per catalyst per hour in the absence of added hydrogen.

6. A process for the catalytic isomerization of normal butane to produce isobutane comprising contacting a butane containing feedstock with a catalyst consisting essentially of at least one compound selected from the group of compounds consisting of oxides and sulphides of metals of group VI of the periodic table, in the absence of added hydrogen and at a temperature in the range of from about 200° C. to about 400° C. and at a pressure in the range of from about 20 to about 50 atmospheres.

DONALD ALBERT HOWES.
ERIC WILLIAM MUSTHER FAWCETT.